United States Patent
Ramamoorthy et al.

(10) Patent No.: US 7,233,125 B2
(45) Date of Patent: Jun. 19, 2007

(54) SYSTEM AND METHOD FOR CONTROLLING AN INDUCTION MOTOR

(75) Inventors: Ramesh T. Ramamoorthy, Streamwood, IL (US); Thomas L. Hopkins, Mundelein, IL (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 11/217,752

(22) Filed: Sep. 1, 2005

(65) Prior Publication Data

US 2007/0046248 A1    Mar. 1, 2007

(51) Int. Cl.
*H02P 27/04* (2006.01)

(52) U.S. Cl. .................. 318/801; 318/635; 318/259; 318/270

(58) Field of Classification Search ............... None
See application file for complete search history.

(56) References Cited

U.S. PATENT DOCUMENTS

| | | | |
|---|---|---|---|
| 4,425,538 A * | 1/1984 | Berney ................. | 318/696 |
| 4,456,830 A | 6/1984 | Cronin ................. | 290/27 |
| 4,611,689 A | 9/1986 | Yoshida et al. ........... | 187/29 |
| 4,683,412 A | 7/1987 | Bialek et al. ............ | 318/798 |
| 5,264,772 A * | 11/1993 | Bahn ................... | 318/701 |
| 5,444,351 A | 8/1995 | Yamamura et al. ......... | 318/811 |
| 5,574,352 A | 11/1996 | Endo et al. ............. | 318/802 |
| 5,650,705 A * | 7/1997 | Hart .................... | 318/635 |
| 5,717,299 A * | 2/1998 | Inagaki et al. ........... | 318/254 |
| 6,031,294 A | 2/2000 | Geis et al. .............. | 290/52 |
| 6,265,786 B1 | 7/2001 | Bosley et al. ............ | 290/52 |
| 6,325,142 B1 | 12/2001 | Bosley et al. ............ | 166/53 |
| 6,995,531 B2 * | 2/2006 | Ichimaru et al. .......... | 318/254 |

* cited by examiner

*Primary Examiner*—Lincoln Donovan
*Assistant Examiner*—Renata McCloud
(74) *Attorney, Agent, or Firm*—Lisa K. Jorgenson; Christopher F. Regan

(57) ABSTRACT

A system controls an induction motor driven by a power inverter circuit. An operational amplifier circuit is operatively connected to the power inverter circuit and operative therewith for sensing DC current and controlling acceleration and deceleration of the induction motor. The operational amplifier circuit includes a first operational amplifier operative in a motoring mode to have a positive polarity output and remain substantially at zero during a regeneration mode. A second operational amplifier circuit is operative in a regeneration mode to have a negative polarity output and remain substantially at zero in a motoring mode.

13 Claims, 2 Drawing Sheets

SYSTEM AND METHOD FOR CONTROLLING AN INDUCTION MOTOR

FIELD OF THE INVENTION

The present invention relates to the field of induction motors, and more particularly, this invention relates to controlling voltage and current overload conditions during acceleration and deceleration of an induction motor.

BACKGROUND OF THE INVENTION

In some prior art inverter fed induction motors, for example, used with some washing machines and similar motor applications, motor speed reversal is a normal occurrence. To avoid over current and voltage conditions during speed reversal, those skilled in the art have attempted to avoid over current and voltage conditions through different techniques.

For example, in one prior art technique, it is possible to disable all pulses to the inverter, and let the motor coast with its inertia to zero speed, and then restart in a reverse direction. A disadvantage to this approach is that coasting takes more time to stop. It is also possible to use vector control. Although this has been found to be an adequate approach for controlling voltage and current during acceleration and deceleration of induction motors, it is expensive. Vector control requires a powerful Digital Signal Processor (DSP) and various sensors, and thus, typically has not always been cost effective. Another approach over designs the power inverter stage to accommodate the voltage and current surges that are expected in end-use applications. This is expensive and usually requires a larger circuit footprint, since the entire circuit is able to handle such voltage and current surges, no matter how rare. In other cases, during motor reversal, detection of over voltage and over current conditions has resulted in removing gate pulses to let the motor coast to zero speed and then restart. This has not always been found adequate.

SUMMARY OF THE INVENTION

In view of the foregoing background, it is therefore an object of the present invention to provide a system and method for controlling an induction motor that is inverter fed that substantially eliminates overcurrent and overvoltage conditions identified above in a cost efficient manner.

This and other objects, features, and advantages are provided by a system for controlling an induction motor driven by a power inverter circuit connected to a power supply and the induction motor, for example, a three-phase induction motor. An operational amplifier circuit is operatively connected to the power inverter circuit and operative therewith for sensing DC current and controlling acceleration and deceleration of the induction motor. This operational amplifier circuit, in one aspect of the invention, includes a first operational amplifier operative in a motoring mode to have a positive polarity output and remain substantially at zero during a regeneration mode. A second operational amplifier is operative in a regeneration mode to have a negative polarity output and remain substantially at zero in a motoring mode.

In another aspect, a current sensing resistor is operatively connected to the power inverter circuit and operational amplifier circuit and has a value such that the voltage across the current sensing resistor will not exceed a clamping limit voltage level of an operational amplifier input. The first and second operational amplifiers can be operative such that when any output exceeds a predetermined amount, a stator frequency of the induction motor is set until the output voltage drops beyond the predetermined value. The power inverter circuit could further be formed as a pulse width modulator (PWM) inverter circuit. The power inverter circuit could also be formed as a monolithic integrated circuit. The power inverter circuit could also be operative for increasing a voltage/frequency ratio during deceleration to provide greater back electromotive force (EMF) to be generated, leading to higher regeneration and faster deceleration.

BRIEF DESCRIPTION OF THE DRAWINGS

Other objects, features and advantages of the present invention will become apparent from the detailed description of the invention which follows, when considered in light of the accompanying drawings in which:

FIG. 2 is another schematic circuit diagram of a voltage source inverter fed induction motor drive similar to that shown in FIG. 1, but showing current flow when one of the transistors connected to the induction motor is ON.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

In accordance with one non-limiting example of the invention, the system and method can typically eliminate over current and over voltage conditions that damage many power inverter stages during deceleration of induction motor drives. The system typically will have minimal hardware and software components. A microcontroller as a power inverter circuit with an insulated gate bipolar transistor (IGBT) is operative with a three-phase induction and permanent magnet and brushless motor cell in one non-limiting example.

The system and method in one non-limiting example permits quick and controlled speed reversal at low cost with a variable speed induction motor controlled by a voltage source inverter. An expensive Digital Signal Processor (DSP) based high end control is typically not required. A separate high wattage expensive bleeder resistor also is typically not required to discharge any regenerated energy. During a speed reversal, gating pulses are not required to be removed on detection of over voltage/current conditions and control is typically not lost during the transition. If the chosen ramp rate is more than the capability of a motor, the actual ramp rate is clamped to a value based on the current and voltage limit settings.

In a variable speed induction motor drive controlled by a voltage source inverter (VSI), for example, speed ramp-up and ramp-down rates can be problematic. During speed ramp up, if the load/inertia is too high such that the motor speed cannot catch close with synchronous speed, heavy currents can flow in the circuits. Conversely, during speed ramp down, if the inertia is too high such that its speed cannot drop down fast, any reduction in synchronous frequency can lead to a jump in DC link current and voltage, which can eventually destroy the power circuit.

Figure 1:
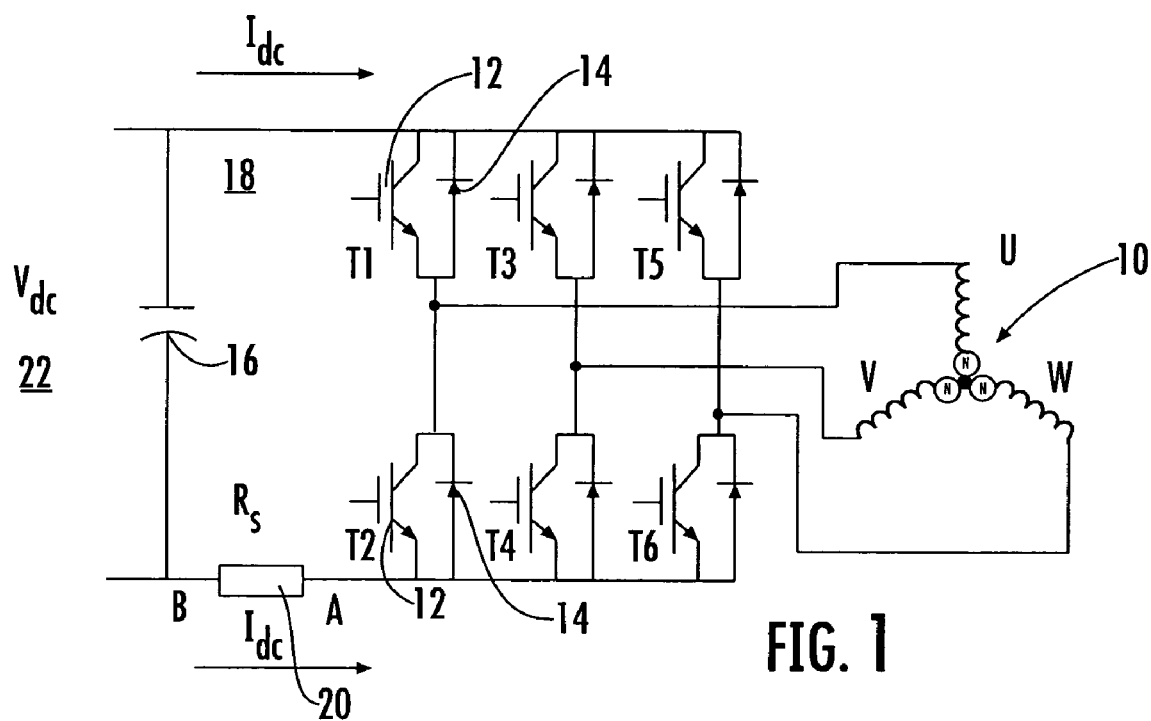
FIG. 1 is a schematic circuit diagram of an example of a typical voltage source inverter fed induction motor drive using a number of series and parallel connected transistors and diodes.

Conventional and low cost current limit control in inverter fed induction motors is typically accomplished by sensing the DC link current, which is usually done by a small value current sensing resistor in the DC link, for example as shown in FIG. 1, which illustrates a three-phase induction motor 10, six transistors 12 (also labeled T1–T6) and associated diodes 14 connected to the induction motor to form this well known inverter feed. A filtering capacitor 16 is parallel to the inverter at the DC link 18. The sensing resistor 20 is series connected to the voltage supply 22. When the machine runs as a motor, power flows from the DC link 18 to the motor 10, as shown in FIG. 1, leading to point A of sensing resistor 20. Point A is at a slightly higher potential than point B. This is independent of the direction of motor rotation.

Figure 2:
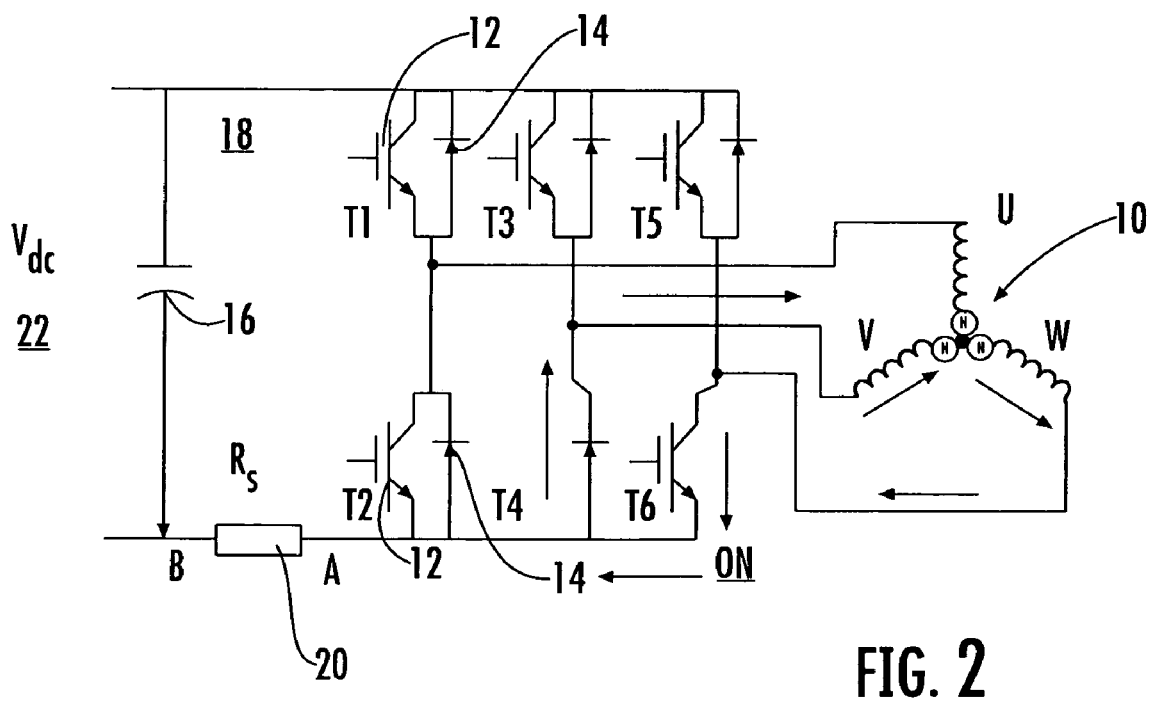
Figure 3:
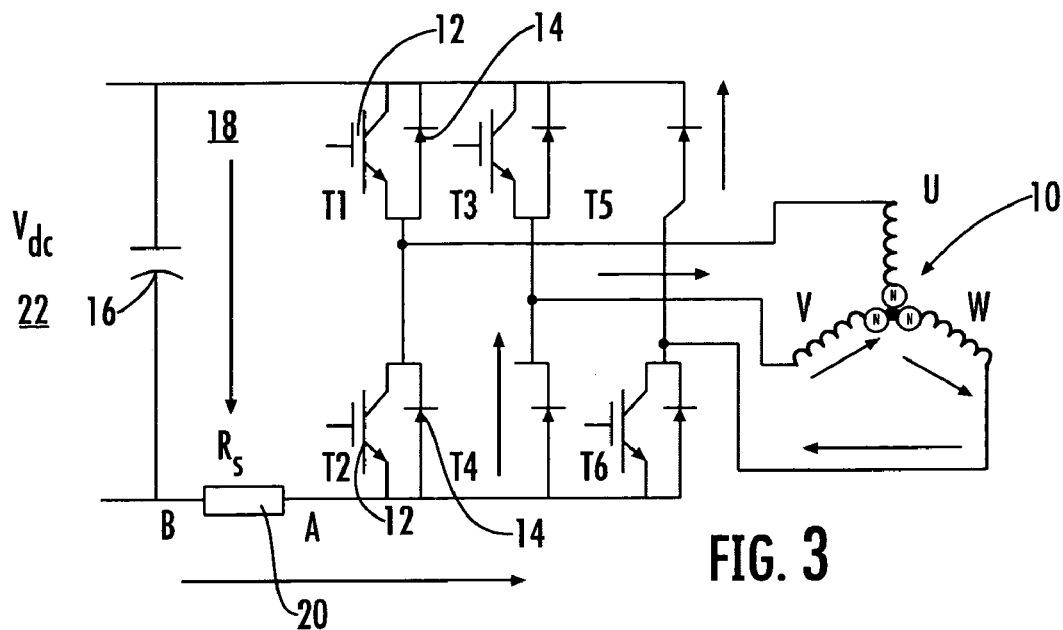
FIG. 3 is another schematic circuit diagram similar to FIG. 2, but showing current flow when the previously ON transistor is OFF.

When the machine is pulled by the load due to its own inertia during deceleration, current direction in the DC link 18 reverses and the voltage across the sensing resistor 20 also reverses in polarity. The machine is said to be in a regeneration mode and the DC link voltage 18 rises. This is explained with reference to FIG. 2 showing the current flow when T6 is ON, as a non-limiting eample.

The circuit designer is always at freedom to GND Va or Vb and use the signal at another lead for control actions. For low cost applications, however, circuit designers prefer to GND Vb so that they work with a positive Va during motoring mode, which is usually the operating mode in most applications, and choose to ignore this signal in regeneration mode.

In washing machine applications as non-limiting examples, where continuous speed reversal is the normal operating mode, these functions as described cannot be ignored. Some designers choose to take away all pulses at the start of reverse sequence and let the motor coast to zero speed and then do reversal, which takes more time. For faster and safer performance, regenerative braking can be accomplished to bring the motor speed down and then reverse.

Figure 4:
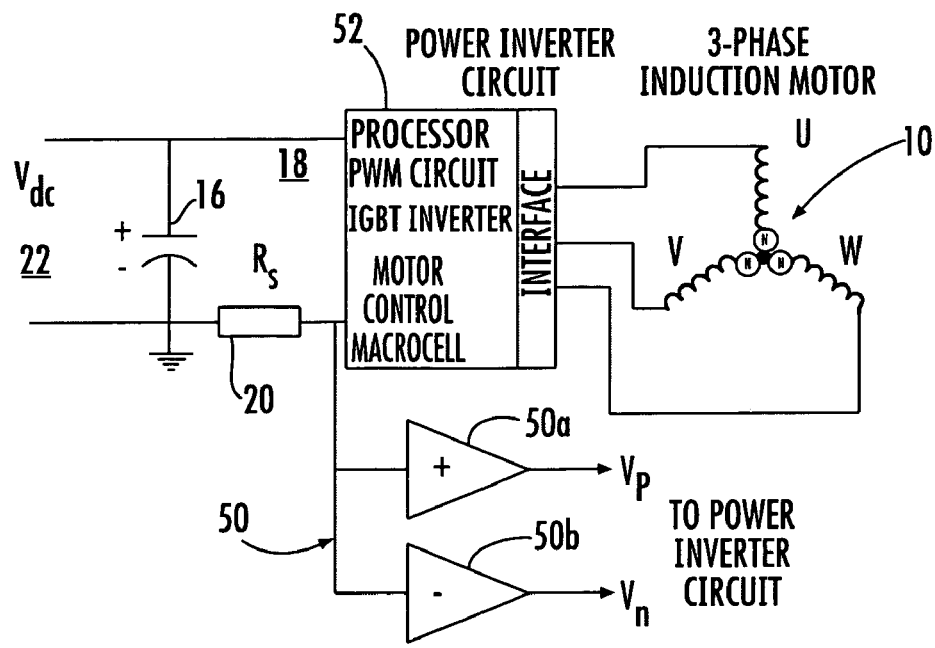
FIG. 4 is a high level block and schematic circuit diagram of the system for controlling an induction motor in accordance with one non-limiting example of the present invention, and showing the power inverter circuit and the operational amplifier circuit as a logic circuit for sensing DC current and controlling acceleration and deceleration of the induction motor.

A negative sense voltage has also been used in some applications. In some low cost, low power applications, such as a washing machine, it is often not an economical choice to use a negative power supply. In accordance with a non-limiting example, a precision rectifier operational amplifier circuit 50 is used (FIG. 4) in conjunction with a power inverter circuit 52 that is operatively connected to the induction motor 10. Vp will give a positive polarity signal during a motoring mode and stay close to zero during regeneration, whereas Vn will give the opposite. Rs should be chosen such that voltage across Rs 20 will not exceed the clamping limit voltage levels of an operational amplifier input.

This operational amplifier circuit 50 includes a first operational amplifier 50a operative in a motoring mode to have a positive polarity output Vp and remain substantially at zero during a regeneration mode. A second operational amplifier 50b is operative in a regeneration mode to have a negative polarity output Vn and remain substantially at zero in the motoring mode. The current sensing resistor 20 is operatively connected to the power inverter circuit 52 and operational amplifier circuit 50 and has a value such that the voltage across the current sensing resistor will not exceed a clamping limit voltage level of the operational amplifier input. The power inverter circuit is operative as a microcontroller or other processor and includes a motor control macrocell, with an ALU processor function, PWM circuit, IGBT and complete inverter and other functions. An interface circuit allows the power inverter circuit 57 to interface to the motor 10.

With this circuit hardware in place, whenever any of these two voltages, Vp or Vn, crosses set limits, the software in the power inverter circuit 52 can be set to freeze the stator frequency until they drop down to within limits. Similarly, during deceleration, if the DC link voltage exceeds a set limit, the stator frequency can be frozen until it drops down to within limits.

By this method, acceleration and deceleration limits can be safely varied without the fear of destruction. If the chosen ramp rate is very high, voltage/control monitoring and control software logic can still protect the set up. Over load during steady running conditions may be handled in an efficient, and sometimes conventional manner.

Also, the motor winding resistance can be used to dissipate the regenerated energy instead of a separate high wattage resistor across DC link. This may increase motor temperature but it can be set within acceptable limits by choosing appropriate deceleration rate. This is also better than dynamic braking because the motor currents are sinusoidally distributed during deceleration instead of using a heavy DC that would stress the power circuits and the windings. Additionally, increasing the V/f ratio during deceleration will cause more back EMF to be generated leading to higher regeneration and faster deceleration.

Different types of power inverter circuits 52 can be used, but one type of power inverter circuit found acceptable is a three-phase induction and permanent magnet and brushless motor cell, such as the ST7MC chip manufactured and sold by STMicroelectronics. The ST7MC is an entire family of microcontrollers that are built around an industry-standard 8-bit core. It has microcontroller peripherals and an on-chip motor control peripheral, i.e., the motor control cell, which is formed from a three-phase Pulse Width Modulator (PWM) circuit that is multiplexed on six high-sink outputs. The circuit includes a highly flexible Back EMF (BEMF), zero-cross and detector, and co-processor unit for central control of a permanent magnet Brushless Direct Current (BLDC) motors. The circuit includes a three-resistor sensorless control system and method that works in conjunction with on-chip comparators, an operational amplifier, and related circuits to provide a high system integration for BMDC motor control. A flash/ROM memory can include about 8 kB through 60 kB memory and a RAM memory can include about 384 kB through 1536 kB memory. The circuit includes an 8-bit core and ALU. The motor control macrocell includes an output circuit, a current amplification and feedback loop circuit, and an input stage circuit as the analog circuit portion. The digital circuit includes a coprocessor with blinking windows, event filters and counters, a sensor/sensorless, PWM/PAM management and six-step/sound wave control with a three-phase sound wave generator for AC induction and operative with a permanent magnet (AC or DC). These circuit components are operative with an internal bus and 16-bit timers, 8-bit auto reload and PWM timers, bi-directional input/outputs, a system safety and control circuit with oscillator and LYD, a serial interface, and a 10-bit analog/digital converter.

The circuit as described can be operative with induction motors used with appliances such as air conditioners, washing machines, dishwasher pumps, food processors, refrigerators, vacuum cleaners and cooking hoods. It is also operative for automotive applications including fuel pumps, water pumps, cooling fans, interior blowers. It can be used with electrical vehicles, HVAC actuators and fans, pumps, blowers and vending and cash machines, paramedical equipment, low and medium-end industrial drives and other similar applications as suggested by those skilled in the art.

The ST7Mc circuit has a single micro approach for control of three-phase induction and BLDC motors. Because it is flexible, it can be used in different families, including 32-pin to 80-pin, and 8kB to 60kB flash/ROM. It can be used in a wide range of motors including compressors from 12 volts to 300 volts and sensor/sensorless control topologies. It can have a trapezoidal six-step or sine wave signal output, voltage/current mode, PWM or PAM control.

The hardware platform usually includes a sensorless BLDC blower and inverter, a control board, a high-voltage isolation board. A debugger/programmer and USB interface allows communication, programming and debugging. Software could include a graphical user interface (GUI) and a set of C software libraries that are edited automatically. The MCU flash memory is programmed and parameters can be modified on-the-fly. It is possible to use an emulator for project finalization depending on the application Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A system for controlling an induction motor comprising:
   a power inverter circuit adapted to be connected to a power supply and an induction motor;
   an operational amplifier circuit operatively connected to said power inverter circuit and operative therewith for sensing DC current and controlling acceleration and deceleration of the induction motor, and including a first operational amplifier operative in a motoring mode to have a positive polarity output and remain substantially at zero during a regeneration mode, and a second operational amplifier operative in a regeneration mode to have a negative polarity output and remain substantially at zero in a motoring mode; a current sensing resistor operatively connected to said power inverter circuit and operational amplifier circuit and having a value wherein the voltage across the current sensing resistor will not exceed a clamping limit voltage level of an operational amplifier input, wherein said power inverter circuit is operative for increasing a voltage/frequency ratio during deceleration to provide greater back electromotive force (EMF) to be generated, leading to higher regeneration and faster deceleration.

2. The system according to claim 1, wherein said first and second operational amplifiers are operative wherein when any output exceeds a predetermined amount, a stator frequency of an induction motor is set until the output voltage drops beyond the predetermined value.

3. The system according to claim 1, wherein said power inverter circuit further comprises a pulse width modulator (PWM) inverter circuit.

4. The system according to claim 1, wherein said power inverter circuit is formed as a monolithic integrated circuit.

5. An induction motor system comprising:
   an induction motor;
   power inverter circuit operatively connected to said induction motor and adapted to be connected to a DC power supply;
   an operational amplifier circuit operatively connected to said power inverter circuit and operative therewith for sensing DC current and controlling acceleration and deceleration of the induction motor, and including a first operational amplifier operative in a motoring mode to have a positive polarity output and remain substantially at zero during a regeneration mode, and a second operational amplifier operative in a regeneration mode to have a negative polarity output and remain substantially at zero in a motoring mode; a current sensing resistor operatively connected to said power inverter circuit and operational amplifier circuit and having a value wherein the voltage across the current sensing resistor will not exceed a clamping limit voltage level of an operational amplifier input, wherein said power inverter circuit is operative for increasing a voltage/frequency ratio during deceleration to provide greater back electromotive force (EMF) to be generated, leading to higher regeneration and faster deceleration.

6. The induction motor system according to claim 5, wherein said induction motor comprises a three-phase induction motor.

7. The induction motor system according to claim 5, and further comprising a filter capacitor connected to said power inverter circuit for filtering DC voltage input into the power inverter circuit.

8. The induction motor system according to claim 5, wherein said first and second operational amplifiers and operative such that when any output exceeds a predetermined amount, a stator frequency of an induction motor is set until the output voltage drops beyond the predetermined value.

9. The induction motor system according to claim 5, wherein said power inverter circuit further comprises a pulse width modulator (PWM) inverter circuit.

10. The induction motor system according to claim 5, wherein said power inverter circuit is formed as a monolithic integrated circuit.

11. A method of controlling an induction motor, which comprises:
    powering an induction motor through a power inverter circuit connected to a DC power supply and the induction motor; providing a current sensing resistor connected to said power inverter circuit and an operational amplifier circuit, the resistor having a value wherein the voltage across the current sensing resistor will not exceed a clamping limit voltage level of an operational amplifier input;

controlling acceleration and deceleration of the induction motor through the power inverter circuit and an operational amplifier circuit operative therewith and having a first operational amplifier that is operative in a motoring mode to have a positive polarity output and remain substantially at zero during a regeneration mode and a second operational amplifier that is operative in a regeneration mode to have a negative polarity output and remain substantially at zero in a motoring mode; and increasing a voltage/frequency ratio during deceleration to provide greater back electromotive force (EMF) to be generated, leading to higher regeneration and faster deceleration.

12. The method according to claim 11, which further comprises powering a three-phase induction motor.

13. The method according to claim 11, which further comprises filtering DC power by a filter capacitor connected to the power inverter circuit.

* * * * *